(12) United States Patent
Gupta et al.

(10) Patent No.: US 11,487,788 B1
(45) Date of Patent: Nov. 1, 2022

(54) LOW LATENCY INGESTION INTO A DATA SYSTEM

(71) Applicant: Snowflake Inc., Bozeman, MT (US)

(72) Inventors: Dhiraj Gupta, San Mateo, CA (US); Subramanian Muralidhar, Mercer Island, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/648,228

(22) Filed: Jan. 18, 2022

(51) Int. Cl.
*G06F 16/00* (2019.01)
*G06F 16/27* (2019.01)
*G06F 16/18* (2019.01)
*G06F 16/2453* (2019.01)
*G06F 16/25* (2019.01)

(52) U.S. Cl.
CPC ........ *G06F 16/278* (2019.01); *G06F 16/1815* (2019.01); *G06F 16/24532* (2019.01); *G06F 16/258* (2019.01)

(58) Field of Classification Search
CPC ............... G06F 16/278; G06F 16/1815; G06F 16/24532; G06F 16/258
See application file for complete search history.

(56) References Cited

U.S. PATENT DOCUMENTS

| | | | |
|---|---|---|---|
| 11,055,280 B2 | 7/2021 | Huang et al. | |
| 2012/0233418 A1* | 9/2012 | Barton | H04L 47/80 711/170 |
| 2012/0233668 A1* | 9/2012 | Leafe | G06F 9/44526 726/4 |
| 2016/0267105 A1* | 9/2016 | Sun | G06F 16/128 |
| 2019/0163754 A1* | 5/2019 | Huang | G06F 16/182 |
| 2020/0272628 A1* | 8/2020 | Dageville | G06F 16/2379 |
| 2020/0272637 A1* | 8/2020 | Motivala | G06F 16/221 |
| 2021/0385085 A1* | 12/2021 | Wang | H04L 67/02 |
| 2022/0043807 A1* | 2/2022 | Dwivedi | G06F 16/221 |

* cited by examiner

*Primary Examiner* — Alexander Khong
(74) *Attorney, Agent, or Firm* — Schwegman Lundberg & Woessner, P.A.

(57) ABSTRACT

Described herein are techniques for improving transfer of metadata from a metadata database to a database stored in a data system, such as a data warehouse. The metadata may be written into the metadata database with a version stamp, which is monotonic increasing register value, and a partition identifier, which can be generated using attribute values of the metadata. A plurality of readers can scan the metadata database based on version stamp and partition identifier values to export the metadata to a cloud storage location. From the cloud storage location, the exported data can be auto ingested into the database, which includes a journal and snapshot table.

24 Claims, 9 Drawing Sheets

US 11,487,788 B1

LOW LATENCY INGESTION INTO A DATA SYSTEM

TECHNICAL FIELD

The present disclosure generally relates to data systems, such as data warehouses, and, more specifically, to automatic ingestion of data with low latency.

BACKGROUND

Data systems, such as data warehouses, may be provided through a cloud platform, which allows organizations and users to store, manage, and retrieve data from the cloud. In addition to customer business data in source tables, customers may wish to store metadata along with the source tables. This metadata can be first stored in a metadata database, but customers typically like the metadata to be stored in the data warehouse so that it can be easily accessed.

Some techniques for transferring the metadata data from a metadata database to the data warehouse can suffer from drawbacks. First, exporting the data to a cloud storage location is typically done periodically (say, every 15 minutes) and thus adds a lag for when the data can be available.

Second, some systems employ a "copy" command to transfer the data from the cloud storage to the data warehouse, which also necessitates the use of a running warehouse for transferring the data to the target table. This conventional approach suffers from significant drawbacks, however. For example, the "copy" command is manually initiated by a user. This manual initiation can cause latency issues with respect to how fresh the data is in the target table, depending on how often the "copy" command is initiated. This manual initiation can also cause some or all the data to be lost if the "copy" task fails. Moreover, operating a running warehouse for the "copy" command typically incurs large expenses.

Third, once the data is transferred to the data warehouse, it typically is combined with the stored data using a "merge" command after each "copy" command. However, the "merge" command can be time consuming and computationally expensive.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Described herein are techniques for improving transfer of metadata from a metadata database to a database stored in a data system, such as a data warehouse. The metadata may be written into the metadata database with a version stamp, which is monotonic increasing register value, and a partition identifier, which can be generated using attribute values of the metadata. Hence, a plurality of readers can scan the metadata database based on version stamp and partition id values to export the metadata to a cloud storage location. From the cloud storage location, the exported data can be auto ingested into the database, which may include a journal and snapshot table. The exported data can be ingested in the journal table where it can be immediately made available for query processing. Then, using a background service operating at longer intervals, the exported data can be merged with the snapshot table. These different techniques can improve latency and reliability in transferring the metadata.

Figure 1:
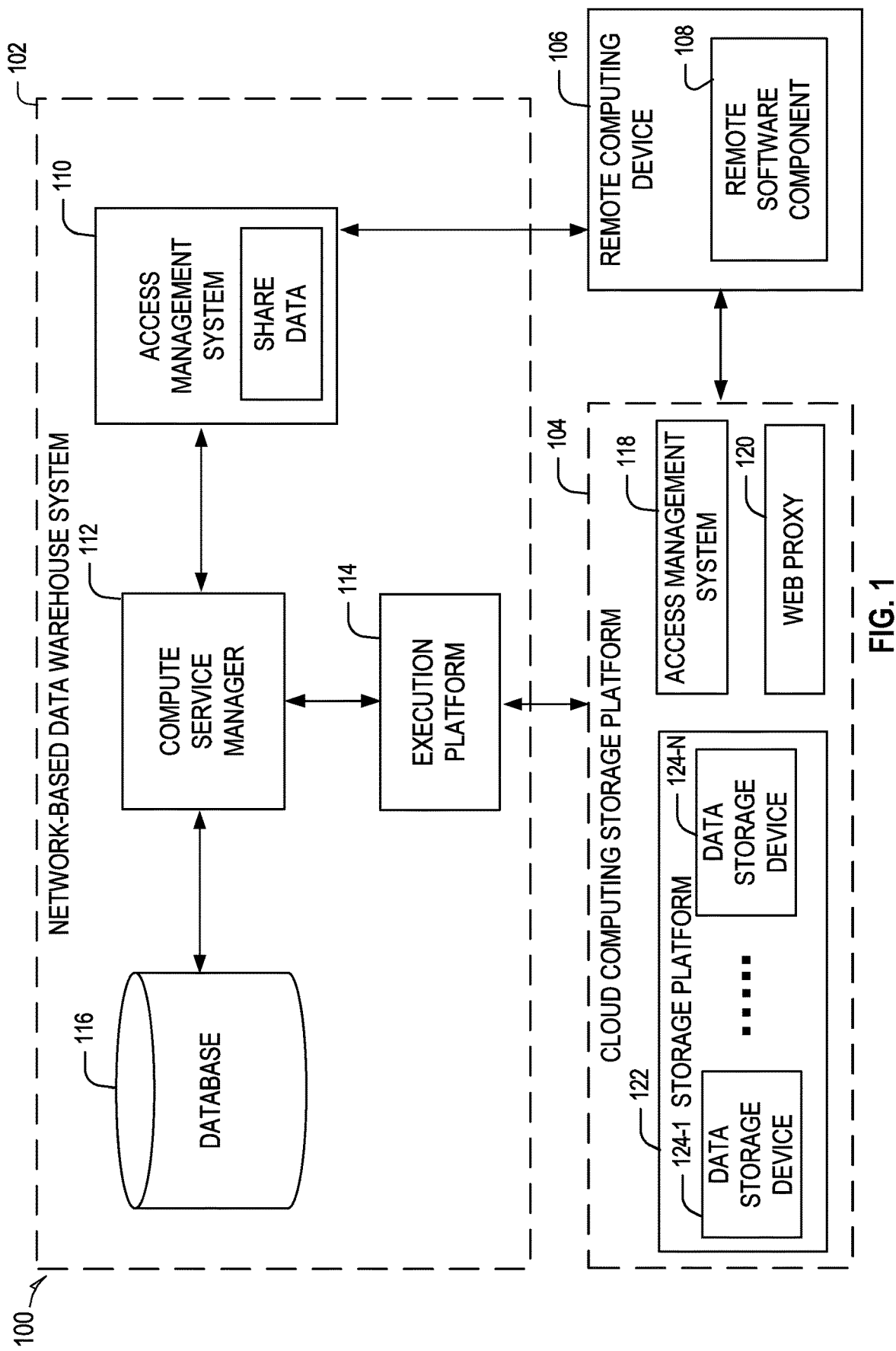
FIG. 1 illustrates an example computing environment in which a cloud database system can implement streams on shared database objects, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based database system 102 comprises an access management system 110, a compute service manager 112, an execution platform 114, and a database 116. The access management system 110 enables administrative users to manage access to resources and services provided by the network-based database system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based database system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based database system 102 to scale quickly in response to changing demands on the systems and components within network-based database system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
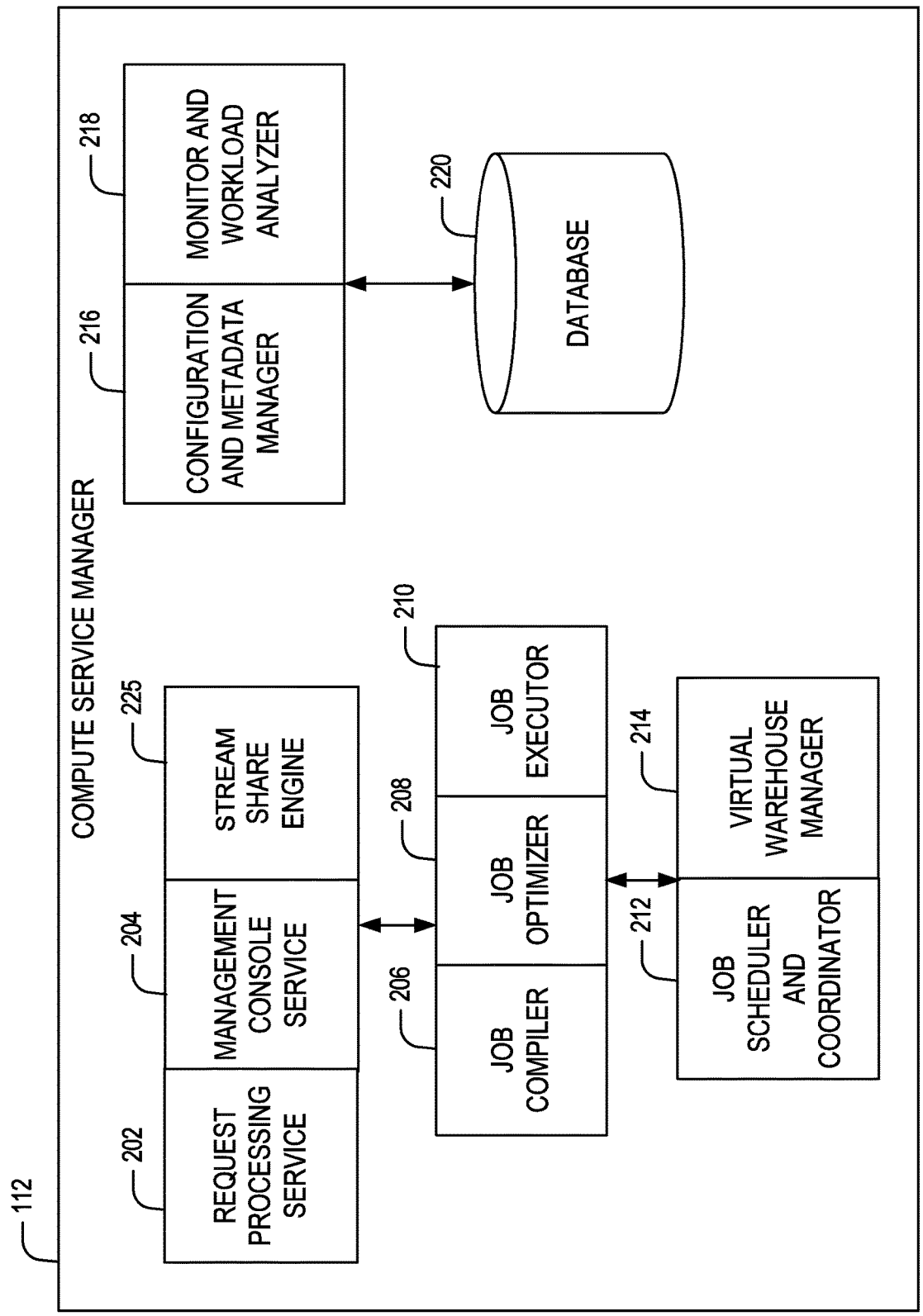
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based database system 102. For example, data storage device 220 may represent caches in execution platform 114, storage devices in cloud computing storage platform 104, or any other storage device.

Figure 3:
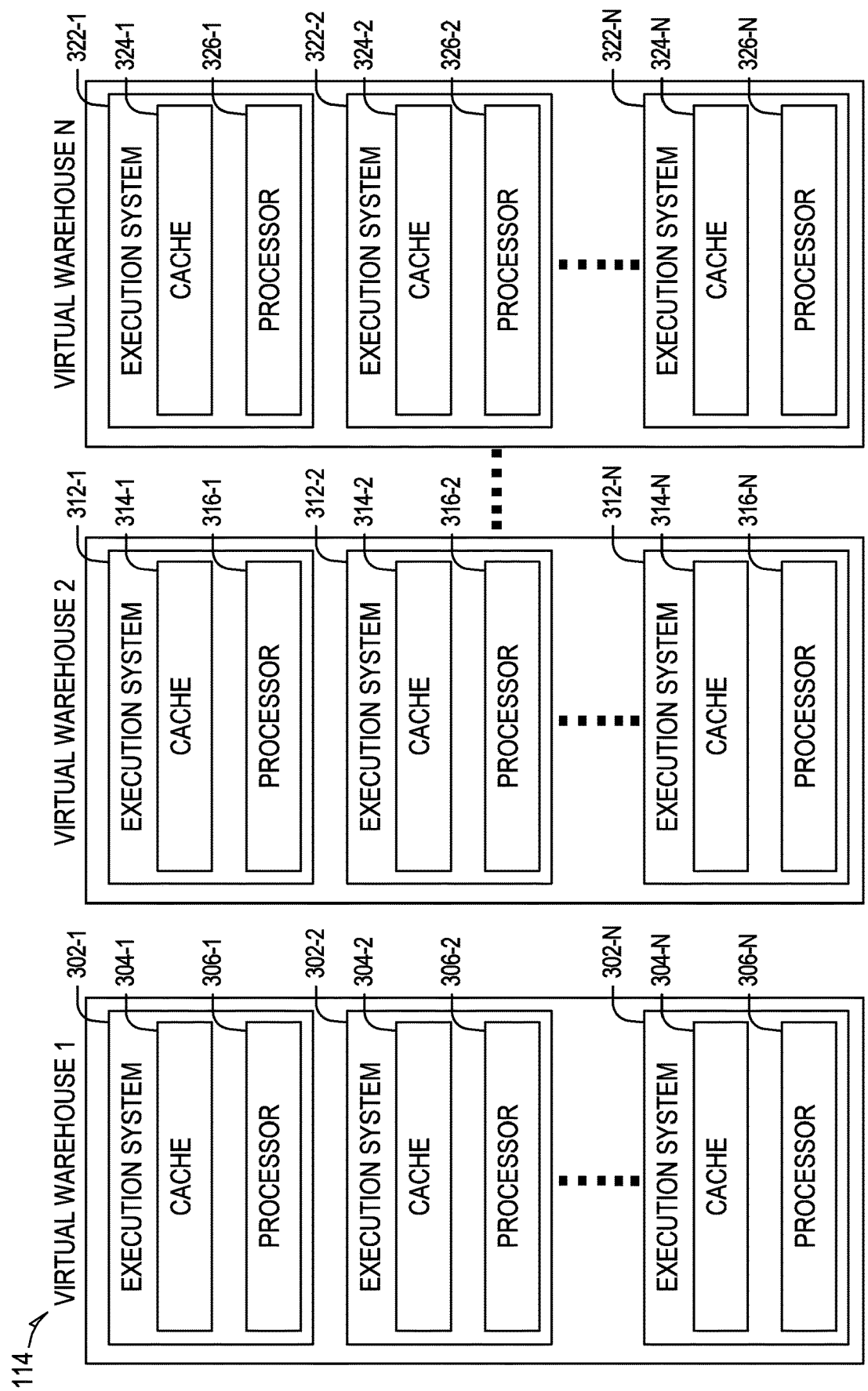
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104.

Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
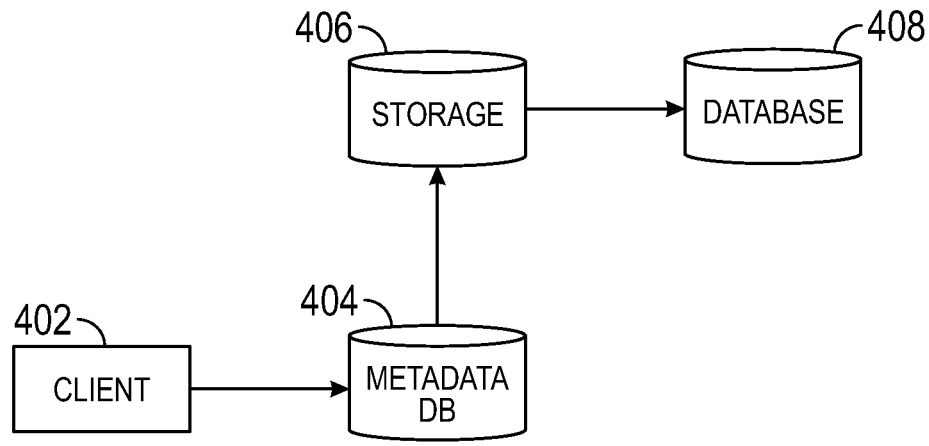
FIG. 4 shows a computing environment used for transferring metadata, according to some example embodiments.

As mentioned, a table may have associated metadata (e.g., metadata manager 216). Metadata for a table may be uploaded to a database storing the table separately from the table data. FIG. 4 shows an example of a computing environment used for transferring metadata, according to some example embodiments. The computing environment may include a client 402, a metadata database 404, a storage 406, and a database 408.

The client 402 may be implemented as a remote computing device as described above (e.g., remote software component 108). The client 402 may write metadata for one or more tables in the metadata database 404. The metadata may be stored in the metadata database 404.

The metadata may be exported from the metadata database 404 to the storage 406. The storage 406 may be provided as cloud storage. In some embodiments, the storage 406 may be a part of the data system. For example, the cloud storage may be provided as a S3 bucket in as part of Amazon Web Services™.

The metadata may then be transferred from the storage 406 to the database 408. The database 408 may also store the table to which the metadata pertains. Moreover, the metadata is then combined with the other metadata for the corresponding table in the database 408.

Each of these steps relating to the storing and moving of the metadata can be complex and lead to latency and reliability issues. For example, in some conventional systems, data from the metadata database 404 is scanned periodically (e.g., every 15 minutes, 1 hour, etc.) to be written to the storage 406. This periodic scanning can increase latency and can lead to reliability issues. For example, the periodic scanning is typically performed based on a wall clock time for when the data is originally written to the metadata database 404. That is, the data written in each epoch time (e.g., last 15 minutes, last 1 hour, etc.) is scanned to be exported. However, clock skew can cause data written at the boundaries to be lost. Moreover, this periodic scanning is typically done by a single reader and large sets to scanned can lead to latency issues.

Figure 5:
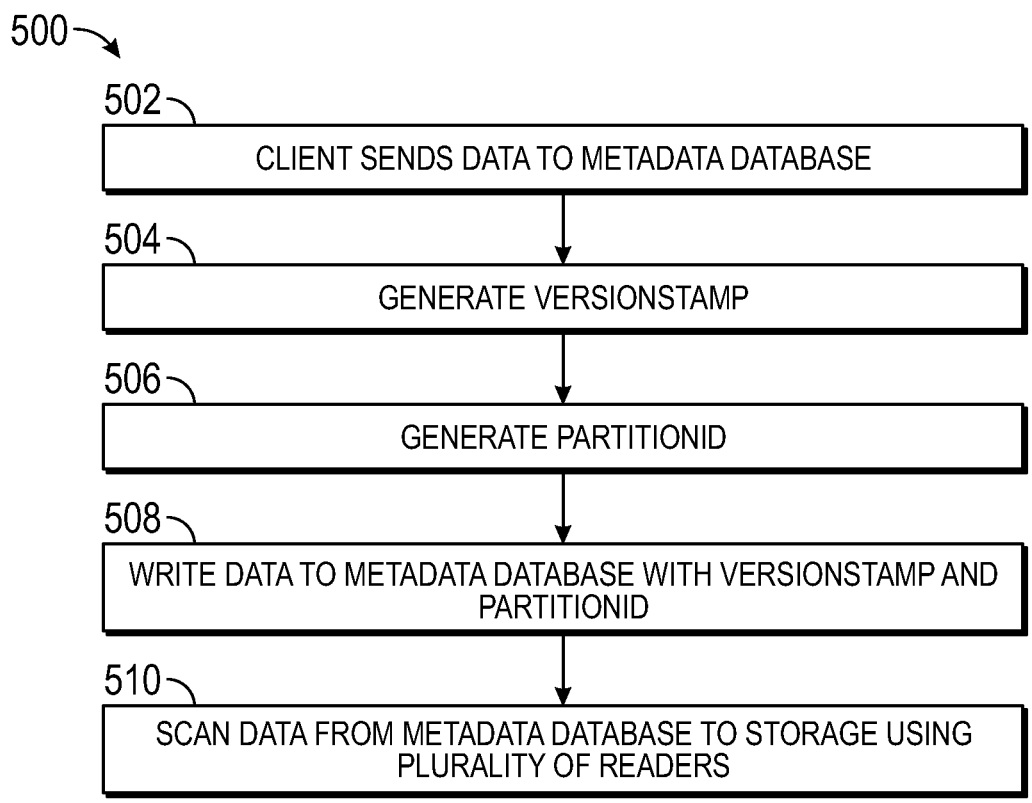
FIG. 5 shows a flow diagram for a method for exporting data, according to some example embodiments.

Next, techniques for improved data exporting from the metadata database 404 to storage 406 are described below. FIG. 5 shows a flow diagram for a method 500 for exporting data, according to some example embodiments. In an example, portions of the method 500 can be performed by the client 402, metadata database 404 and storage 406 as described above with reference to FIG. 4. At operation 502, the client may send metadata to the metadata database. For example, a customer may create a new named "table 5" for account 1, and this information may be sent to the metadata database.

At operation 504, a VersionStamp may be generated and assigned for the new data. For example, the VersionStamp may be generated by the metadata database 404. The VersionStamp may be based on a monotonic increasing register. That is, each piece of new data (e.g., slice of data persistence object (DPO)) when written to the metadata database caused the VersionStamp register to increase in value and that VersionStamp value is assigned to the new data. For example, if data A was written to the metadata database and it was assigned VersionStamp value 7. The next data written to the metadata database (say, data B) would be assigned VersionStamp value 8, and the next data written to the metadata database after that (say, data C) would be assigned VersionStamp value 9, and so on.

The VersionStamp values may not be specific or related to any attributes of the data (e.g., account, table, etc.). Hence, the VersionStamp may be independent of the type of data and can be used as a reference point for exporting data without the reliability issues associated with using a timestamps based on wall clock subject to clock skew, as described above.

At operation 506, a partitionID may be generated and assigned for the new data. For example, the partitionID may be generated by the metadata database 404. A maximum number of partitions may be set (e.g., 16, 32, etc.) and each piece of new data (e.g., slice of DPO) may be assigned a partition from the maximum number of partitions. The paritionID may separate incoming data into sets (or partitions) of data.

The partitionID may be implemented as a function of attributes of the new data. In some embodiments, the partitionID may be a function of the data identification (e.g., tableID) and the account identification (e.g., accountID). For example, the partitionID may be generated based on hashing the relevant attributes modular divided by the number of maximum partitions (i.e., modular). In one example, the parititonID may be generated using data identification and account identification as follows:

partitionID=hash (tableID, accountID) % (maximum number of partitions)

At 508, the received data with the assigned VersionStamp and partitionID may be written to the metadata database. For example, a writer component may write this information to the metadata database where it is stored. A plurality of writers (e.g., writer computing resources) may be provided, and writers may be assigned based on the partitionID. The writing of the data may be done at the same time as the assignment of the VerstionStamp and/or partitionID. For example, the VersionStamp may be based on the time the data was written to the metadata database.

At 510, a plurality of readers (e.g., reader computing resources) may scan stored metadata in the metadata database to write the data into storage, such as cloud storage, based on the partitionID and VersionStamp. In some embodiments, the readers may perform the scan periodically (say, every 5 seconds) at a faster rate than conventional systems and scan the most current data stored in the metadata database based on the VersionStamps. For example, in a first scan, the readers may scan new data up to a specific VersionStamp, say x. In the next scan, the readers scan new data with VersionStamps starting from x+1 to y, and the next scan after that may scan new data with VersionStamps starting from y+1 and so on. The use of VersionStamps, which are monotonically increased, reduces the risk of skipping data as compared to techniques that use timestamp due to clock drift issues mentioned above and allows scanning to be done at more frequent intervals, reducing latency issues.

Moreover, the use of partitionIDs allow multiple readers to scan stored data in parallel. A reader may be assigned one or more non-overlapping partitions to scan. For example, a reader may be assigned one partition, such that the number of readers equals the number of partitions. In some embodiments, a reader may be assigned a plurality of partitions, such that the number of readers is less than the number of partitions.

A mapping of partitions to readers may be assigned. For example, the partition-to-reader mapping can be implemented as follows:

reader-id=mod(partitionID, number of readers)

Flexibility and dynamic allocation of readers and partitions may also be implemented. The number of partitions and/or number of readers can be changed dynamically. However, some safeguard may be put in place to ensure data accuracy and reliability.

Figure 6:
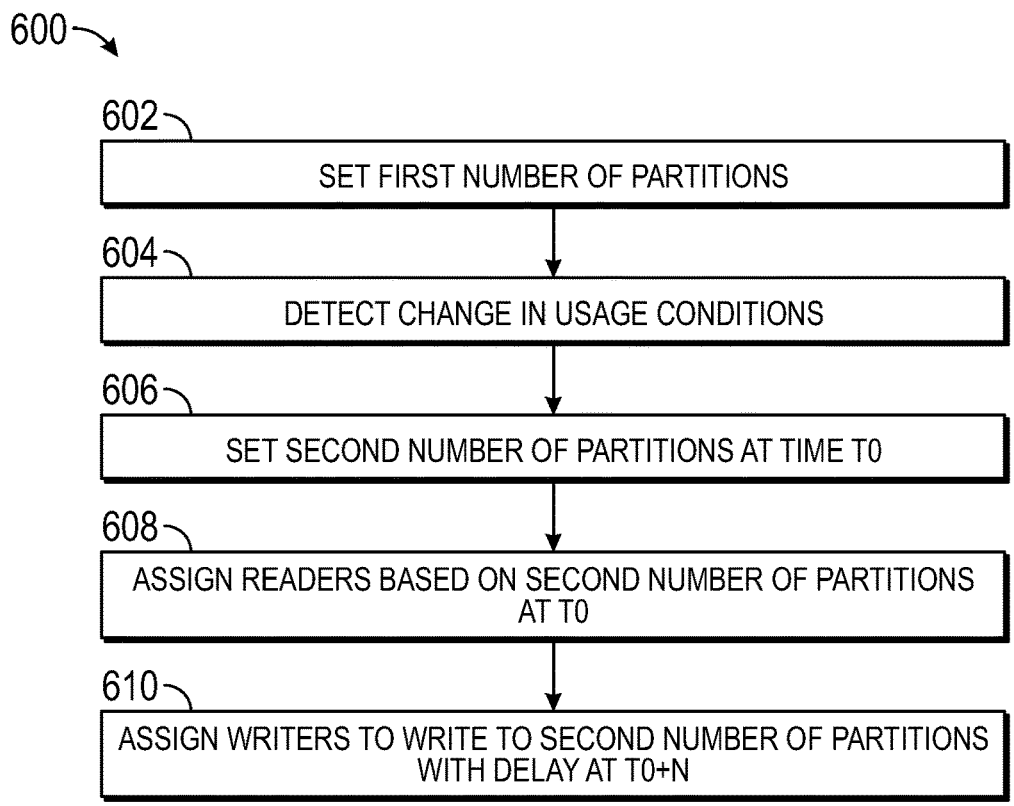
FIG. 6 a flow diagram for a method for dynamically changing the number of partitions, according to some example embodiments.

FIG. 6 shows a flow diagram for a method 600 for dynamically changing the number of partitions, according to some example embodiments. At operation 602, a first number of maximum partitions may be set, e.g., 16 partitions. The first number may be based on current usage conditions.

At operation 604, a change in usage conditions may be detected. The system may detect that the amount of data being sent to the metadata database is changing; hence, the number of partitions should change accordingly. In some embodiments, thresholds may be used to detect the change in usage conditions. For example, if usage conditions exceed a high threshold, this may indicate that the number of partitions should be increased to facilitate the use of more parallel readers. If usage conditions fall below a low threshold, this may indicate that the number of partitions should be decreased so as to conserve computing resources.

At 606, the system may change the number of maximum partitions to a second value, e.g., 32 partitions based on the detected change in usage conditions. The change may be set to be implemented for a specified time, e.g., time T0. At operation 608, the system may assign the number of readers based on the new second number of partitions to go into effect at the specified time, e.g., T0.

However, the system may delay writing to the new partitions so that new data is not missed. At operation 610, the system may delay writers writing new data to the new partition assignments by some time, e.g., T0+n, where n is a specified delay time. Thus, readers may start reading from the new partition assignment at substantially the same time as when the new second number of partitions are set, but writers may continue writing to the first number of partitions until a specified delay. It may be that for the time between the change and the delay (T0–T0+n), some readers may not be in use because no data is being written to their assigned partitions. This delay, however, ensures that data is not missed by the writers who are writing the newly arrived data in the metadata database and generating the partitionIDs.

Safeguards may also be put into place when changing the number of readers. A change in the number of readers or assignment of readers may be set based on checkpoints relating to VersionStamps. That is, the change in reader assignment may be set to a specified VersionStamp, not a specified time. For example, consider the system, based on detected usage conditions, increases the number of readers that scan data in the metadata DB based on partitionIDs and VersionStamps to export to storage. The system may specify a checkpoint of a VersionStamp number the current assignment of readers should read until before switching the number of readers.

An example: the system is scanning data using 16 readers; however, the system changes the number of readers to 32 readers for data with VersionStamps higher than 20. Thus, the 16 currently assigned readers will continue scanning the data until one of the 16 readers scans data with VersionStamp 20, thus crossing the set checkpoint. After that, the currently assigned readers will stop scanning, and the system will change the reader assignment to 32 readers and the 32 readers will then continue scanning data with VersionStamp 20 and so on based on the new reader assignments.

Referring back to FIG. 4, the next step in the transfer of the metadata is from the storage 406 to the database 408. Some conventional techniques use a "copy" command for this transfer. The "copy" command is typically manually performed or performed based on a set schedule (say, every 15 minutes). However, the use of such "copy" commands can add more latency.

Figure 7:
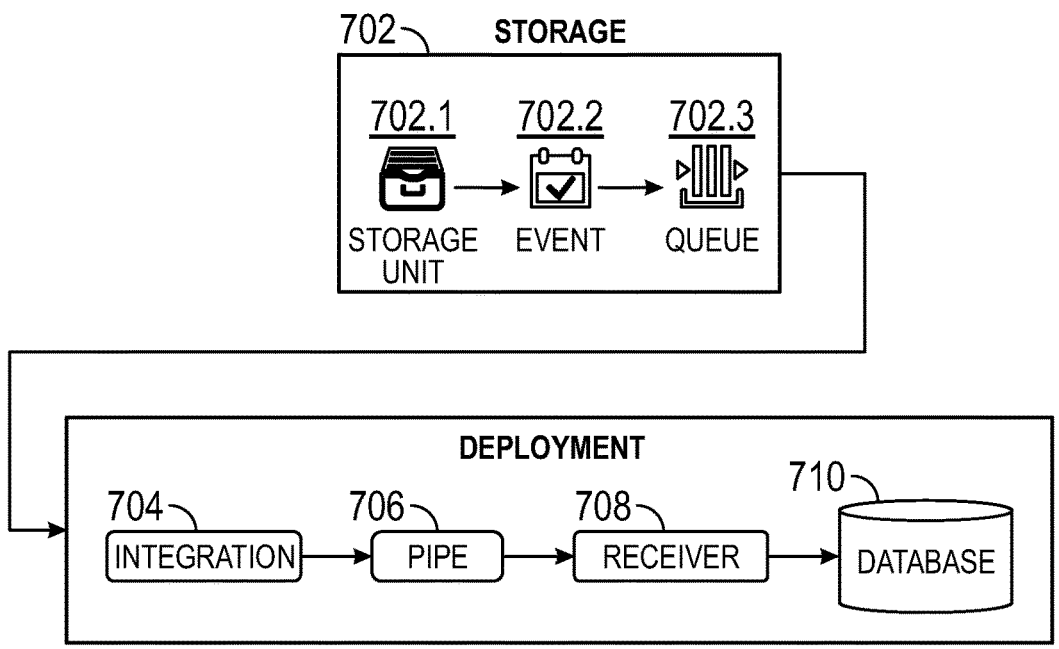
FIG. 7 illustrates a simplified block diagram of a system for automated data ingestion, according to some example embodiments.

Thus, this data transfer from the storage 406 to the database 408 may be improved by implementing auto-ingestion techniques, as described in further detail below. FIG. 7 is a simplified block diagram of system 700 for automated data ingestion, according to some example embodiments. The system may include a storage 702, which may be provided as cloud storage (e.g., storage 406). The storage 702 may include data that has been exported from a metadata database using the techniques described above.

The storage 702 may store data (or files) from the metadata database to be ingested into a database 710. In some embodiments, the storage 702 may include a storage unit 702.1, an event block 702.2, and a queue 702.3. The system may also include a deployment to ingest data in the database 710. The deployment may be communicatively coupled to the queue 702.3, and may include an integration 704, a pipe 706, and a receiver 708.

Integration 704 may be configured to receive a notification when new data becomes available in queue 702.3. For example, the queue may include a pool of Simple Queue Service™ (SQS) queues as part of an Amazon Web Services™ S3 bucket. The pool of SQS queues may be provided to client accounts to add user files to a bucket. A notification may be automatically generated when one or more user files are added to a client account data bucket. A plurality of customer data buckets may be provided for each client account. The automatically generated notification may be received by the integration 704.

For example, the integration 704 may provide information relating to an occurrence of an event in the queue 702.3. Events may include creation of new data, update of old data, and deletion of old data. The integration 704 may also provide identification information for a resource associated with the event, e.g., the user file that has been created, updated, or deleted. The integration 704 may communicate with the queue 702.3 because the integration 704 may be provided with credentials for the queue 702.3, for example by an administrator and/or user. In an embodiment, the integration 704 may poll the queue 702.3 for notifications.

The integration 704 may deliver the notification to the pipe 706, which may be provided as a single pipe or multiple pipes. The pipe 706 may store information relating to what data and the location of the data for automatic data ingestion related to the queue 702.3.

The receiver 708 may perform the automated data ingestion, and then store the ingested data in the database 710. Data ingestion may be performed using the techniques described in U.S. patent application Ser. No. 16/201,854, entitled "Batch Data Ingestion in Database Systems," filed on Nov. 27, 2018, which is incorporated herein by reference in its entirety, including but not limited to those portions that specifically appear hereinafter, the incorporation by reference being made with the following exception: In the event that any portion of the above-referenced application is inconsistent with this application, this application supersedes the above-referenced application.

Figure 8:
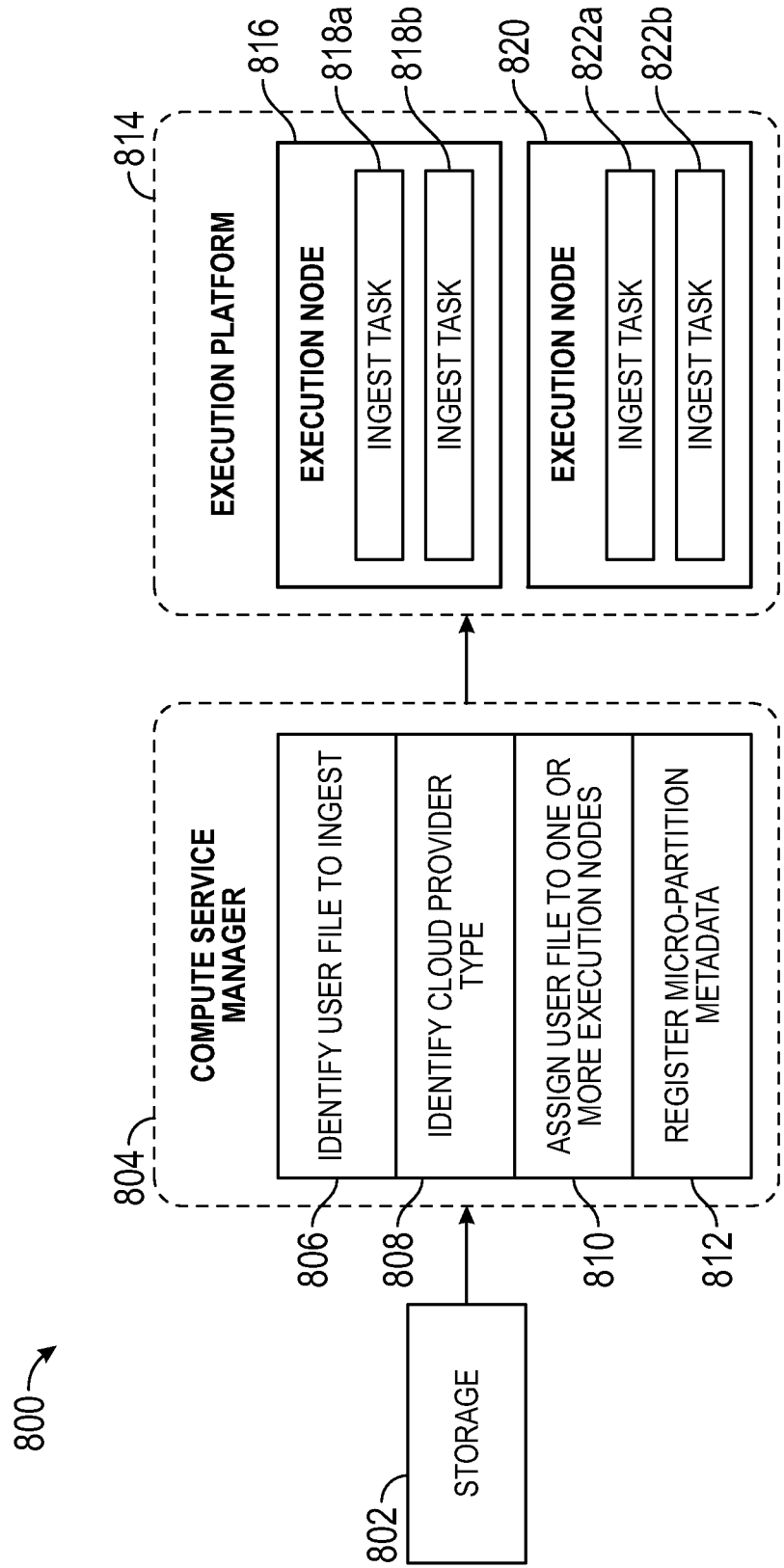
FIG. 8 is a schematic block diagram of a process of ingesting data into a database, according to some example embodiments.

FIG. 8 is a schematic block diagram of a process 800 of ingesting data into a database, according to some example embodiments. The process 800 begins and a storage 802 sends an ingest request, such as a notification. The storage 802 may directly or indirectly communicate with the database system to send in the ingest request. In some embodiments, the ingest request is a notification provided by a third-party vendor storage account, or the ingest request may arise from a compute service manager polling a data lake associated with the client account to determine whether any user files have been added to the client account that have not yet been ingested into the database. The notification includes a list of files to insert into a table of the database. The files are persisted in a queue specific to the receiving table of the database.

The ingest request is received by a compute service manager 804. The compute service manager 804 identifies at step 806 a user file to ingest. At step 808, the compute service manager identifies a cloud provider type associated with the client account. At step 810, the compute service manager 804 may assign the user file to one or more execution nodes, based at least in part on the detected cloud provider type, and registers at step 812 micro-partition metadata associated with a database table after the file is ingested into a micro-partition of the database table. The compute service manager 804 provisions one or more execution nodes 816, 820 of an execution platform 814 to perform one or more tasks associated with ingesting the user file. Such ingest tasks 818a, 818b, 822a, 822b include, for example, cutting a file into one or more sections, generating a new micro-partition based on the user file, and/or inserting the new micro-partition in a table of the database.

The process 800 begins an IngestTask that will run on a warehouse. The IngestTask will pull user files from the queue for a database table until it is told to stop doing so. The IngestTask will periodically cut a new user file and add it to the database table. In one embodiment, the ingest process is "serverless" in that it is an integrated service provided by the database or compute service manager 804. That is, a user associated with the client account need not provision its own warehouse or a third-party warehouse in order to perform the ingestion process. For example, the database or database provided (e.g., via instances of the compute service manager 804) may maintain the ingest warehouse that then services one or more or all accounts/customers of the database provider.

In some embodiments, there may be more than one IngestTask pulling from a queue for a given table, and this might be necessary to keep up with the rate of incoming data. In some embodiments, the IngestTask may decide the time to cut a new file to increase the chances of getting an ideal sized file and avoid "odd sized" files that would result if the file size was line up with one or more user files. This may come at the cost of added complexity as the track line number of the files consumed must be tracked.

Referring back to FIG. 4, once the data has been transferred to the database 408, it still needs to be combined with the relevant table(s) stored in the database 408. Some conventional techniques use a "merge" command for each "copy" command. That is, the database 408 would "merge" newly received data ("raw data") with data stored in the relevant tables ("clean data") in response to each "copy" command. However, the use of such "merge" commands can be very time consuming.

Next, techniques to improve combining the newly received data (e.g., "raw data") with the stored data (e.g., "clean data") so that the newly received data is made available for applications, such as query processing, faster are described below. The techniques may employ using journal and snapshot tables instead one just one table that stores all data for a given table.

Figure 9:
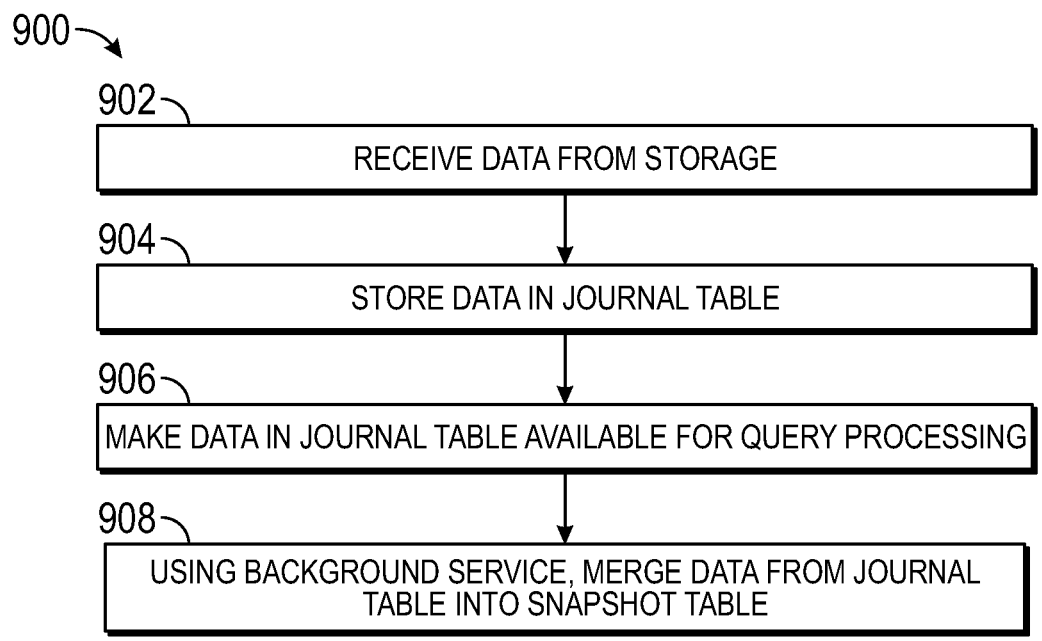
FIG. 9 shows a flow diagram of a method for data ingestion into a database using a journal and snapshot table, according to some example embodiments.

FIG. 9 shows a flow diagram of a method 900 for data ingestion into a database using a journal and snapshot table, according to some example embodiments. At operation 902, the database may receive data from a storage (e.g., storage 406) to be combined with data in a snapshot table, which includes relevant stored data ("clean data").

At operation 904, the database may store the received data (from ingestion) into a journal table that is related to the snapshot table but separate from the snapshot table. Instead of the new data being directly ingested and then merged with the clean data, the journal table may store the newly ingested data.

At operation 906, the database may make the newly ingested data in the journal table available for application processing, such as query processing, before the data is merged with the "clean data" in the snapshot table using a view, as described in further detail below. Thus, the view may allow query processing of data in the journal table which is not yet merged with the "clean data" in the snapshot table.

At operation 908, using a background service that operates periodically (e.g., every few hours), the data in the journal table may be merged or combined with the clean data in the snapshot table. The background service may merge the data from the journal to the snapshot table at specified times (e.g., intervals). After the data in the journal table is merged in the snapshot table, that data may be removed from the journal table. Because the data in the journal table is available for applications, such as query processing, the background service may operate at longer intervals, such as every few hours, as compared to issuing a merge command immediately upon receiving the data as in other systems described above. These techniques thus conserve computing resources because merge commands are generally very time consuming.

Figure 10:
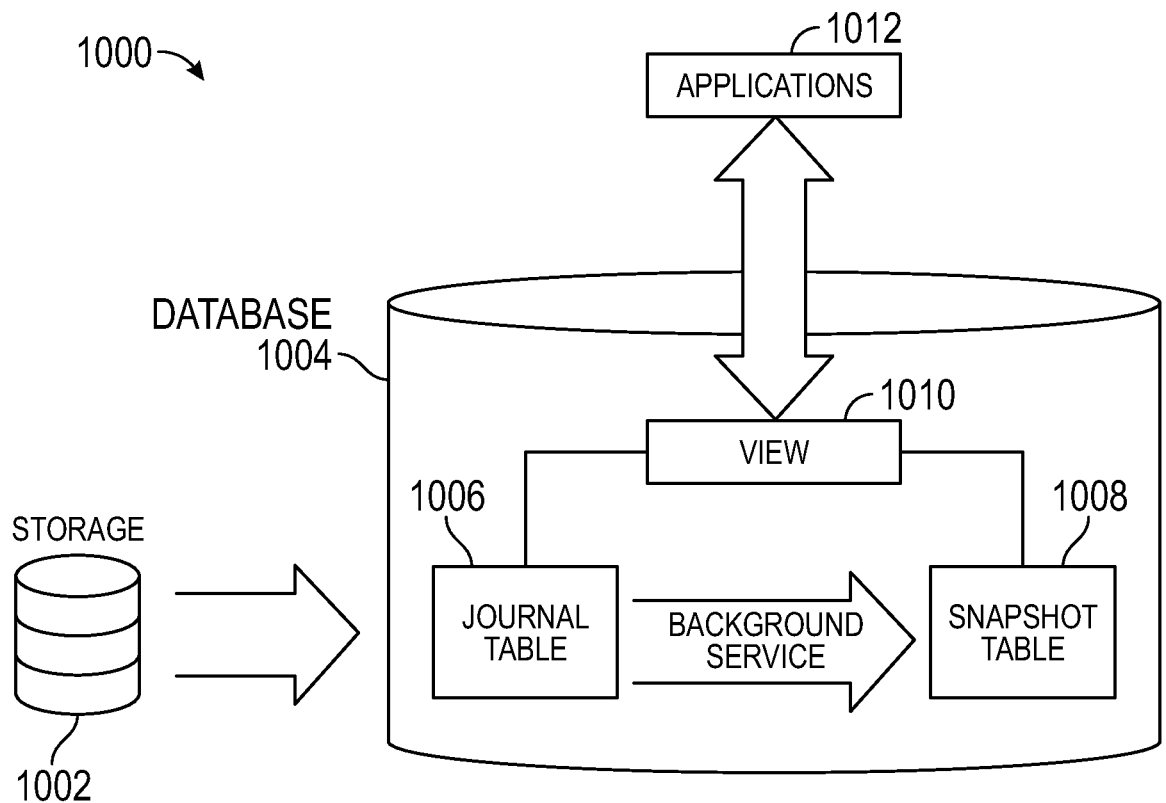
FIG. 10 illustrates an example of a database environment with a journal and snapshot table, according to some example embodiments.

FIG. 10 illustrates an example of a database environment 1000 with a journal and snapshot table, according to some example embodiments. The database environment 1000 may include a storage 1002, a database 1004 with a journal table 1006, a snapshot table 1008, and a view 1010, and applications 1012. The storage 1002 may store metadata exported from a metadata database, as described above. The data from the storage 1002 may be ingested into the journal table 1006, as described above. The snapshot table 1008 may store "clean data," as described above. The view 1010 may be generated based on the data stored in the journal table 1006 and snapshot table 1008. The view 1010 provides a homogenous interface for the data in the journal table 1006 and snapshot table 1008 from the viewpoint of the applications 1012. For example, a user may submit a query using applications 1012 where the query relates to data from the both the journal table 1006 and snapshot table 1008. The query therefore is processed using the view 1010, as described in further detail below.

Moreover, a background service may run at specified intervals to merge the data in journal table 1006 to the snapshot table 1008. These intervals may be spaced apart (e.g., hours) because the view 1010 makes the data in the journal table 1006 available immediately after ingestion but before merging and because merging commands are time consuming and expensive. Reducing the number of merge commands can significantly improve efficiency.

Figure 11:
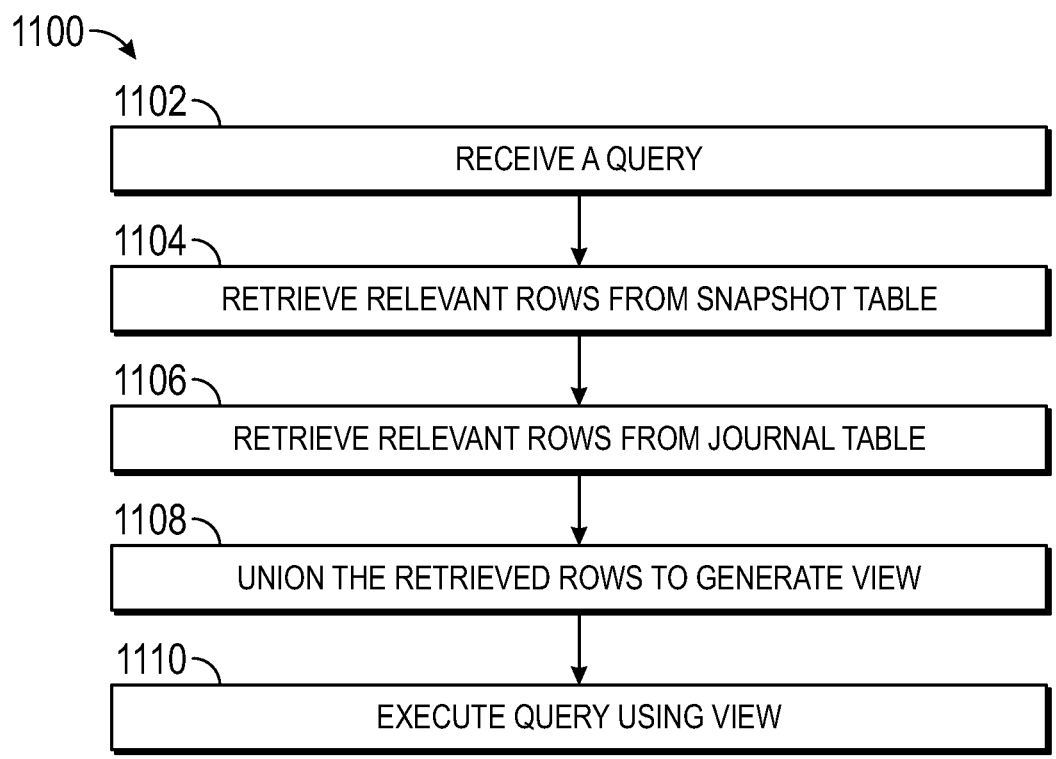
FIG. 11 shows a flow diagram of a method for processing a query, according to some example embodiments.

FIG. 11 shows a flow diagram of a method 1100 for processing a query, according to some example embodiments. At operation 1102, the data system may receive a query. The query may relate to data stored in a snapshot table and data stored in a journal table, which has not yet been merged with the snapshot table, as described herein. Hence, the data system may process the query using both the data stored in the snapshot table and the journal table by generating a view, as described herein.

At operation 1104, the view may retrieve relevant rows from the snapshot table, which do not have a corresponding more recent entry in the journal table. At operation 1106, the view may retrieve relevant rows from the journal table. For each rowID in the journal table, the view may retrieve the most recent entry. For example, if the journal table includes two entries for rowID=5, then view retrieves the most recent of the two entries for rowID=5.

At operation 1108, the retrieved data from the snapshot table and the retrieved data from the journal table may be joined (e.g., union operator) to generate the view for query execution. This joining of the snapshot and journal table data may present a unified view of the data. At operation 1110, the query may be executed using the joined data (i.e., the view), and a result of the query may be generated and transmitted to the requester of the query.

Figure 12:
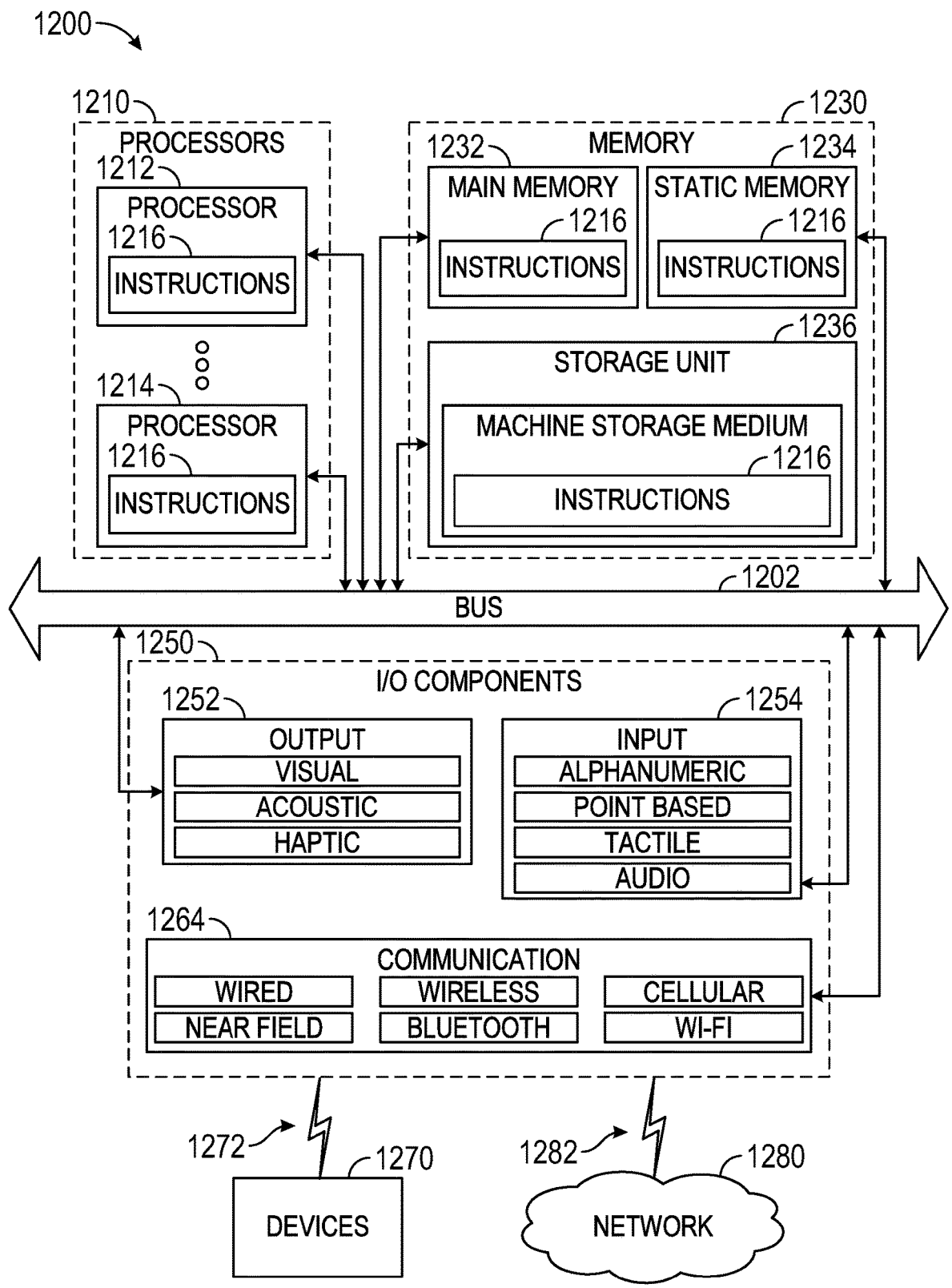
FIG. 12 illustrates a diagrammatic representation of a machine in the form of a computer system within which a set of instructions may be executed for causing the machine to perform any one or more of the methodologies discussed herein, in accordance with some embodiments of the present disclosure.

FIG. 12 illustrates a diagrammatic representation of a machine 1200 in the form of a computer system within which a set of instructions may be executed for causing the machine 1200 to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may cause the machine 1200 to execute any one or more operations of any one or more of the methods described herein. As another example, the instructions 1216 may cause the machine 1200 to implement portions of the data flows described herein. In this way, the instructions 1216 transform a general, non-programmed machine into a particular machine 1200 (e.g., the remote computing device 106, the access management system 118, the compute service manager 112, the execution platform 114, the access management system 110, the Web proxy 120, remote computing device 106) that is specially configured to carry out any one of the described and illustrated functions in the manner described herein.

In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 includes processors 1210, memory 1230, and input/output (I/O) components 1250 configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors 1210 that may comprise two or more independent processors (sometimes referred to as "cores") that may execute instructions 1216 contemporaneously. Although FIG. 12 shows multiple processors 1210, the machine 1200 may include a single processor with a single core, a single processor with multiple cores (e.g., a multi-core processor), multiple processors with a single core, multiple processors with multiple cores, or any combination thereof.

The memory 1230 may include a main memory 1232, a static memory 1234, and a storage unit 1236, all accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 include components to receive input, provide output, produce output, transmit information, exchange information, capture measurements, and so on. The specific I/O components 1250 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, and other communication components to provide communication via other modalities. The devices 1270 may be another machine or any of a wide variety of peripheral devices (e.g., a peripheral device coupled via a universal serial bus (USB)). For example, as noted above, the machine 1200 may correspond to any one of the remote computing device 106, the access management system 118, the compute service manager 112, the execution platform 114, the access management system 110, the Web proxy 120, and the devices 1270 may include any other of these systems and devices.

The various memories (e.g., 1230, 1232, 1234, and/or memory of the processor(s) 1210 and/or the storage unit 1236) may store one or more sets of instructions 1216 and data structures (e.g., software) embodying or utilized by any one or more of the methodologies or functions described herein. These instructions 1216, when executed by the processor(s) 1210, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1280 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1

A method comprising: receiving data into a metadata database; generating a version stamp for the received data; generating a partition identifier for the received data, the partition identifier being based on one or more attribute values of the received data; using one or more writer computing resources, writing the received data into the metadata database with the generated version stamp and partition identifier; and using a plurality of reader computing resources, scanning the metadata database and exporting the received data to a storage location based on the version stamp and partition identifier, the plurality of readers being assigned based on partition identifiers.

Example 2

The method of example 2, wherein the partition identifier is generated using data identification and account identification values.

Example 3

The method of any of examples 1-2, wherein generating the partition identifier includes hashing the data identification and account identification values.

Example 4

The method of any of examples 1-3, further comprising: changing a number of partitions, including: setting a first number of partitions; detecting a change in usage conditions; based on the detected change in usage conditions, setting a second number partitions to go into effect at a specified time; and assigning the plurality of reader computing resources based on the second number of partitions to scan the metadata database starting at the specified time.

Example 5

The method of any of examples 1-4, further comprising: assigning the one or more writer computing resources to write new data to the second number partitions starting at the specified time plus a delay.

Example 6

The method of any of examples 1-5, further comprising: changing a number of reader computing resources, the changing of the number of reader computing resources including: setting a first number of reader computing resources; detecting a change in usage conditions; and based on the detected change in usage conditions, setting a second number of reader computing resources, wherein the second number of computing resources is set to go into effect based on a checkpoint relating to version stamp values.

Example 7

The method of any of examples 1-6, further comprising: receiving a notification from the storage indicating that the exported data is stored in the storage; and in response to the notification, ingesting the exported data from the storage into a database.

Example 8

The method of any of examples 1-7, further comprising: ingesting the exported data into a journal table in the database; making the exported data in the journal table accessible for query processing before the exported data is merged with a snapshot table; and using a background service operating at specified intervals, merging the exported data from the journal table into the snapshot table.

Example 9

The method of any of examples 1-8, wherein the version stamp is a monotonic increasing register value.

Example 10

A system comprising: one or more processors of a machine; and a memory storing instructions that, when executed by the one or more processors, cause the machine to perform operations implementing any one of example methods 1 to 9.

Example 11

A machine-readable storage device embodying instructions that, when executed by a machine, cause the machine to perform operations implementing any one of example methods 1 to 9.

What is claimed is:

1. A method comprising:
   receiving data into a metadata database;
   generating a version stamp for the received data;
   generating a partition identifier for the received data, the partition identifier being based on one or more attribute values of the received data;
   using one or more writer computing resources, writing the received data into the metadata database with the generated version stamp and partition identifier;
   using a plurality of reader computing resources, scanning the metadata database and exporting the received data to a storage location based on the version stamp and partition identifier, the plurality of readers being assigned based on partition identifiers; and
   changing a number of partitions, including:
      setting a first number of partitions,
      detecting a change in usage conditions,
      based on the detected change in usage conditions, setting a second number partitions to go into effect at a specified time, and assigning the plurality of reader computing resources based on the second number of partitions to scan the metadata database starting at the specified time.

2. The method of claim 1, wherein the partition identifier is generated using data identification and account identification values.

3. The method of claim 2, wherein generating the partition identifier includes hashing the data identification and account identification values.

4. The method of claim 1, further comprising:
assigning the one or more writer computing resources to write new data to the second number partitions starting at the specified time plus a delay.

5. The method of claim 1, further comprising:
changing a number of reader computing resources, the changing of the number of reader computing resources including:
setting a first number of reader computing resources;
detecting a change in usage conditions; and
based on the detected change in usage conditions, setting a second number of reader computing resources, wherein the second number of computing resources is set to go into effect based on a checkpoint relating to version stamp values.

6. The method of claim 1, further comprising:
receiving a notification from a storage indicating that the exported data is stored in the storage; and
in response to the notification, ingesting the exported data from the storage into a database.

7. The method of claim 6, further comprising:
ingesting the exported data into a journal table in the database;
making the exported data in the journal table accessible for query processing before the exported data is merged with a snapshot table; and
using a background service operating at specified intervals, merging the exported data from the journal table into the snapshot table.

8. The method of claim 1, wherein the version stamp is a monotonic increasing register value.

9. A machine-storage medium embodying instructions that, when executed by a machine, cause the machine to perform operations comprising:
receiving data into a metadata database;
generating a version stamp for the received data;
generating a partition identifier for the received data, the partition identifier being based on one or more attribute values of the received data;
using one or more writer computing resources, writing the received data into the metadata database with the generated version stamp and partition identifier;
using a plurality of reader computing resources, scanning the metadata database and exporting the received data to a storage location based on the version stamp and partition identifier, the plurality of readers being assigned based on partition identifiers; and
changing a number of partitions, including:
setting a first number of partitions,
detecting a change in usage conditions,
based on the detected change in usage conditions, setting a second number partitions to go into effect at a specified time, and
assigning the plurality of reader computing resources based on the second number of partitions to scan the metadata database starting at the specified time.

10. The machine-storage medium of claim 9, wherein the partition identifier is generated using data identification and account identification values.

11. The machine-storage medium of claim 10, wherein generating the partition identifier includes hashing the data identification and account identification values.

12. The machine-storage medium of claim 9, further comprising:
assigning the one or more writer computing resources to write new data to the second number partitions starting at the specified time plus a delay.

13. The machine-storage medium of claim 9, further comprising:
changing a number of reader computing resources, the changing of the number of reader computing resources including:
setting a first number of reader computing resources;
detecting a change in usage conditions; and
based on the detected change in usage conditions, setting a second number of reader computing resources, wherein the second number of computing resources is set to go into effect based on a checkpoint relating to version stamp values.

14. The machine-storage medium of claim 9, further comprising:
receiving a notification from a storage indicating that the exported data is stored in the storage; and
in response to the notification, ingesting the exported data from the storage into a database.

15. The machine-storage medium of claim 14, further comprising:
ingesting the exported data into a journal table in the database;
making the exported data in the journal table accessible for query processing before the exported data is merged with a snapshot table; and
using a background service operating at specified intervals, merging the exported data from the journal table into the snapshot table.

16. The machine-storage medium of claim 9, wherein the version stamp is a monotonic increasing register value.

17. A system comprising:
at least one hardware processor; and
at least one memory storing instructions that, when executed by the at least one hardware processor, cause the at least one hardware processor to perform operations comprising:
receiving data into a metadata database;
generating a version stamp for the received data;
generating a partition identifier for the received data, the partition identifier being based on one or more attribute values of the received data;
using one or more writer computing resources, writing the received data into the metadata database with the generated version stamp and partition identifier;
using a plurality of reader computing resources, scanning the metadata database and exporting the received data to a storage location based on the version stamp and partition identifier, the plurality of readers being assigned based on partition identifiers; and
changing a number of partitions, including:
setting a first number of partitions,
detecting a change in usage conditions,
based on the detected change in usage conditions, setting a second number partitions to go into effect at a specified time, and assigning the plurality of reader computing resources based on the second number of partitions to scan the metadata database starting at the specified time.

18. The system of claim 17, wherein the partition identifier is generated using data identification and account identification values.

19. The system of claim 18, wherein generating the partition identifier includes hashing the data identification and account identification values.

20. The system of claim 17, the operations further comprising:
assigning the one or more writer computing resources to write new data to the second number partitions starting at the specified time plus a delay.

21. The system of claim 17, the operations further comprising:
changing a number of reader computing resources, the changing of the number of reader computing resources including:
setting a first number of reader computing resources;
detecting a change in usage conditions; and
based on the detected change in usage conditions, setting a second number of reader computing resources, wherein the second number of computing resources is set to go into effect based on a checkpoint relating to version stamp values.

22. The system of claim 17, the operations further comprising:
receiving a notification from a storage indicating that the exported data is stored in the storage; and
in response to the notification, ingesting the exported data from the storage into a database.

23. The system of claim 22, the operations further comprising:
ingesting the exported data into a journal table in the database;
making the exported data in the journal table accessible for query processing before the exported data is merged with a snapshot table; and
using a background service operating at specified intervals, merging the exported data from the journal table into the snapshot table.

24. The system of claim 17, wherein the version stamp is a monotonic increasing register value.

* * * * *